United States Patent [19]

Katoh

[11] 3,866,856

[45] Feb. 18, 1975

[54] AUTOMATIC TAPE LOADING TYPE, RECORDING AND/OR REPRODUCING APPARATUS

[75] Inventor: Hiroshi Katoh, Yokohama, Japan

[73] Assignee: Victor Company of Japan Ltd., Yokohama City, Kanagawa-ken, Japan

[22] Filed: Aug. 2, 1973

[21] Appl. No.: 384,939

[30] Foreign Application Priority Data

Aug. 3, 1972 Japan .............................. 47-77813

Aug. 11, 1972 Japan .............................. 47-79891

[52] U.S. Cl. .................... 242/188, 242/198, 360/74

[51] Int. Cl...... B65h 59/38, G03b 1/04, G11b 1/52

[58] Field of Search .................... 242/188, 197–210; 274/4 R, 4 B–4F; 179/100.2 Z, 100.2 T, 100.2 ZA

[56] References Cited

UNITED STATES PATENTS

| | | | |
|---|---|---|---|
| 3,643,038 | 2/1972 | Sato | 179/100.2 T |
| 3,672,684 | 6/1972 | Kawakami | 274/4 D |
| 3,735,035 | 5/1973 | Eibensteiner | 179/100.2 ZA |
| 3,764,088 | 10/1973 | Yamada et al. | 242/195 |
| 3,764,757 | 10/1973 | Inaga | 179/100.2 ZA |
| 3,781,487 | 12/1973 | Swain et al. | 179/100.2 Z |

*Primary Examiner*—Leonard D. Christian

[57] ABSTRACT

An automatic-tape-loading type, recording and/or reproducing apparatus comprises means for drawing out a tape-form recording medium from a tape storing housing structure. The tape is automatically loaded along a specific tape path outside of the housing structure. The recording/reproducing of signals on/from the recording medium occurs while the tape is traveling along the specific tape path. Then the tape is restored into the tape storing housing structure. The means for the recording medium comprises a takeup reel disc for driving a takeup reel within the storing housing structure. A driving roller presses against and drives the takeup reel disc. A first locking means locks the driving roller in its pressed state for driving against the takeup reel disc in relation to the control manipulation used for placing the apparatus in the recording-/reproducing mode and for unlocking the driving roller in response to changeover of the operation to stop mode. A second locking means is operated by drawing the tape out of the storing housing structure to lock the driving roller in its pressed state for driving against the reel disc and unlocking the driving roller when all of the recording medium has been returned into the storing housing. Even when the driving roller is unlocked by the first locking device, when control manipulation for the stop mode is effected, it continues to be held in a pressed state against the reel disc by the second locking device in its locking state, thereby to drive the reel disc.

8 Claims, 26 Drawing Figures

AUTOMATIC TAPE LOADING TYPE, RECORDING AND/OR REPRODUCING APPARATUS

BACKGROUND OF THE INVENTION

This invention relates generally to a recording and/or reproducing apparatus of an automatic-tape-loading type and more particularly to an apparatus wherein a recording tape is drawn out of a tape storing housing structure and loaded into a specific tape path at the time of the recording/reproducing mode of operation. This tape is restored into the housing structure at the end of playback. Still more specifically, the invention relates to an automatic-tape-loading type recording/reproducing apparatus having tape storing means of a simple organization. A driving roller, for driving a take-up reel disc, is pressed against this reel disc when the recording/reproducing mode of the apparatus is changed over to the stopping mode even when the control level returns to the stop position, and to put the tape back in a tape storing housing structure.

A recording/reproducing apparatus of an automatic-tape-loading type accomplishes recording/reproducing by drawing the recording tape out of a cassette and wrapping it around a guide drum, over a specific angular range. In this apparatus, an operation is required for restoring the tape into the original cassette. This restoring operation is carried out by a tension arm within the cassette in an apparatus wherein the length of tape paid out of the cassette at the time the recording/reproducing mode of operation is relatively short.

On the other hand, in an apparatus wherein the length of the tape paid out of the cassette at the time of recording/reproducing operation is relatively long, rotational power is imparted in the tape take-up direction, to the take-up reel or supply reel disc. By the use of this means, and as unloading is carried out, the tape which has been drawn out of the cassette is successively returned into the cassette. For this reason, in addition to a mechanism for imparting rotational power in the tape take-up direction to the take-up reel disc at the time of recording/reproducing operation, the prior requires a separate mechanism for the unloading operation and for returning the tape into the tape storing housing, whereby the apparatus organization becomes complicated.

SUMMARY OF THE INVENTION

Accordingly, it is a general object of the present invention to provide a new and useful recording/reproducing apparatus of automatic-tape-loading type which overcomes the above described difficulties.

A specific object of the invention is to provide an automatic-tape-loading recording/reproducing apparatus having first locking means operating when a control manipulation means is moved to a recording/reproducing position, to thereby hold a driving roller in a position where it is pressed against the take-up reel disc. A second locking means is operated when a tape loading means is in a position other than an unloading completion position. The first locking means is rendered inoperative in the case where the apparatus is controlled to changeover from its recording/reproducing mode to its stopped state. The driving roller is further held in the position where it is pressed against the above mentioned reel disc by the second locking device.

In accordance with the present invention, the operation of restoring the tape into the cassette, at the time of the unloading operation, can be carried out by means for imparting rotational power to the take-up reel disc in the tape take-up direction at the time of recording/reproducing operation. There is no necessity whatsoever of providing a special mechanism for so returning the tape restoring operation accompanying the unloading operation.

Another object of the invention is to provide an automatic-tape-loading type, recording/reproducing apparatus. Here, an object is to render inoperative the above mentioned second locking means upon completion of the unloading operation and upon complete restoration within the cassette. The pressing of the driving roller against the reel disc is terminated, and the apparatus is stopped.

Still another object of the invention is to provide an automatic-tape-loading type, recording/reproducing apparatus in which the above mentioned second locking means is rendered inoperative when a revolving ring for drawing the tape out of the cassette and loading it in a specific tape path returns to its original unloading completion position.

A furhter object of the invention is to provide an automatic-tape-loading type, recording/reproducing apparatus. Here, an object is to provide detection means provided in a specific position in the tape path, for detecting a specific divisional part of the tape at the time of the recording/reproducing mode. The mode of this recording/reproducing apparatus is changed over to the above mentioned unloading mode. Then, when the tape has been completely returned into the cassette, it stopped.

A still further object of the invention is to provide an automatic-tape-loading type, recording/reproducing apparatus wherein fast-forward control can be effected by pushing a push button to move beforehand an aengagement means. Then, by turning a control lever through the same control movement, at the time of recording/reproducing control manipulation, a plurality of control cams are rotated unitarily with a control lever. In accordance with the present invention, it is possible to carry out, easily and positively, changeover of the mode of operation of the apparatus from stop to recording/reproducing, and to fast-forward.

Other objects and further features of the present invention will be apparent from the following detailed description set forth in conjunction with the accompanying drawings.

DETAILED DESCRIPTION

The structural organization and operation of the automatic-tape-loading, recording/reproducing apparatus having an operative device for converting to stop mode, according to the present invention, will first be described with reference to FIGS. 1, 2, 3, 4A and 4B.

Figure 1:
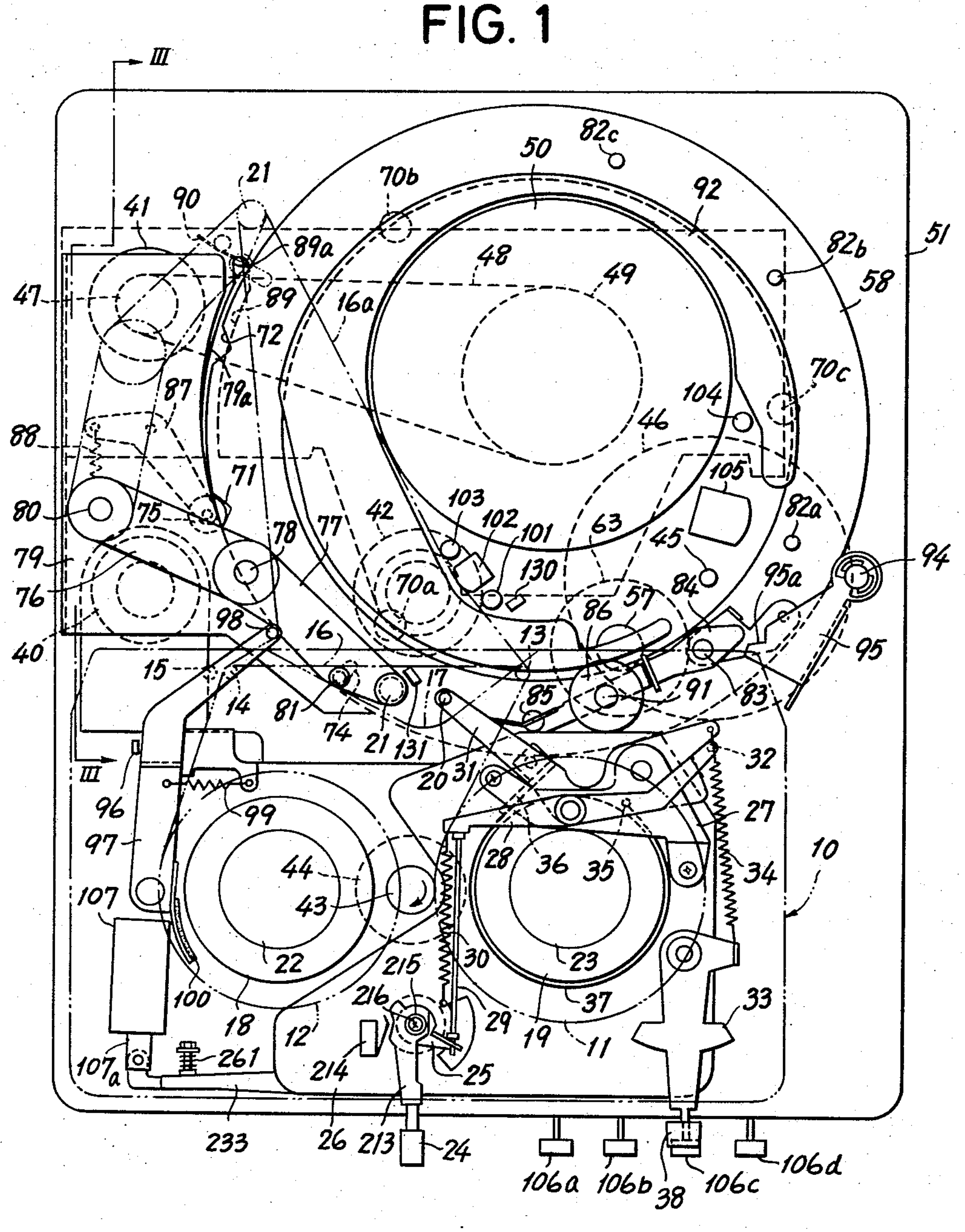
FIGS. 1 and 2 are plan views showing one embodiment of an automatic-tape-loading type recording/reproducing apparatus, according to the present invention, respectively in the disengaged and operative states.
Figure 2:
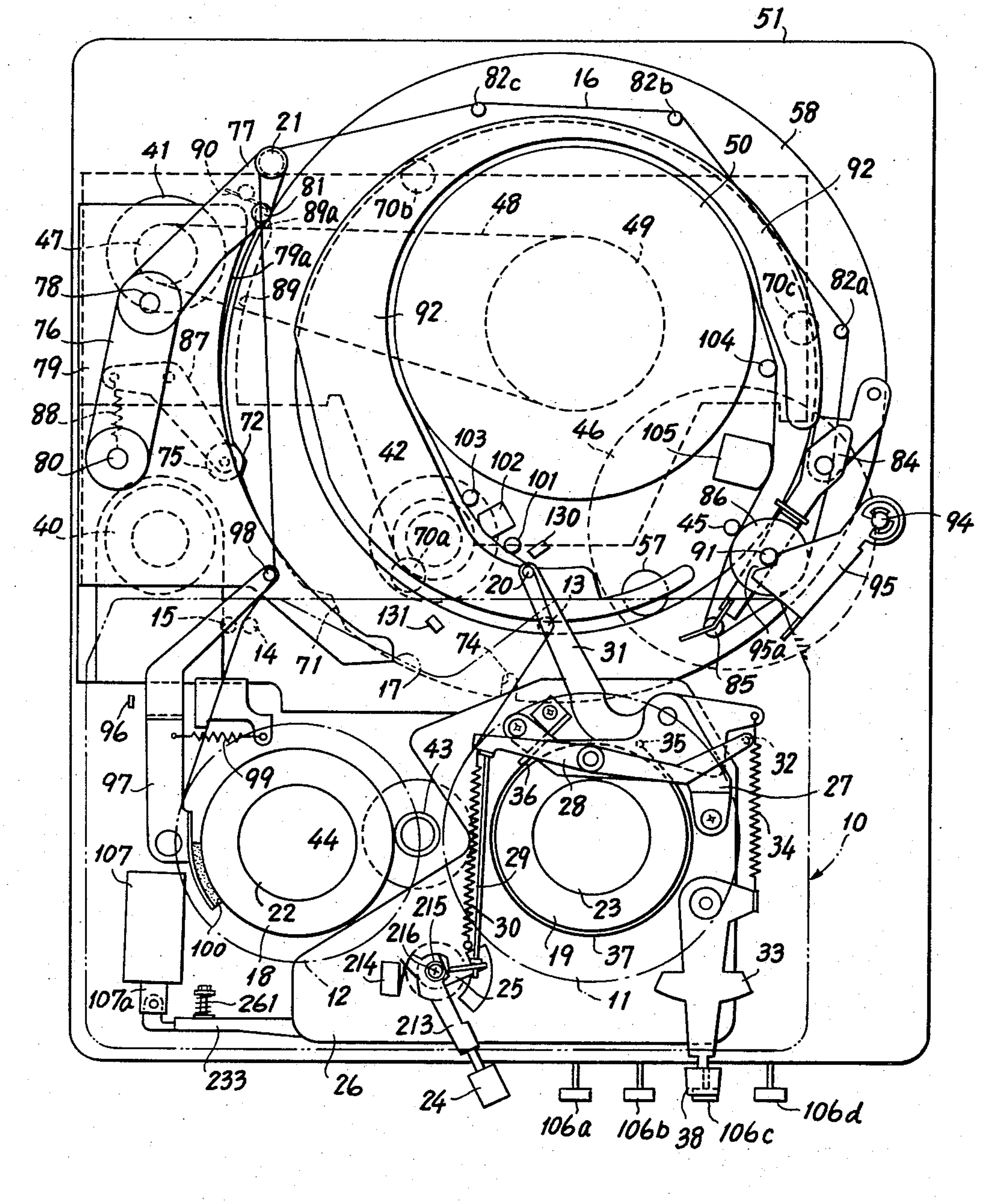
Figure 3:
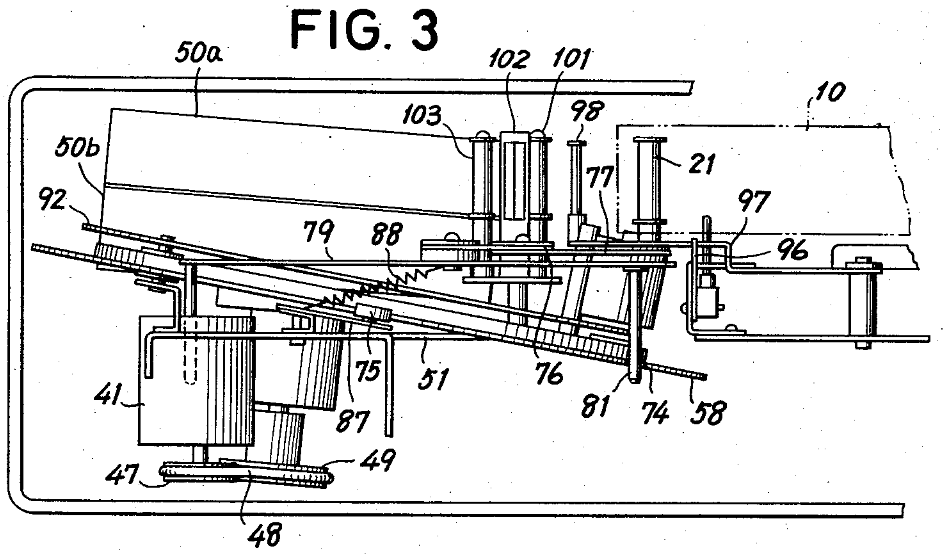
FIG. 3 is a side view in vertical section taken along the line III—III in FIG. 1 and viewed in the arrow direction.

Referring principally to FIGS. 1, 2 and 3, a tape cassette 10 contains therein a tape supply roll 11 and a tape take-up roll 12. Within the tape cassette 10, there are further provided tape guide pins 13, 14 and 15, whereby a magnetic tape 16 drawn out from the tape supply roll 11 is guided by the guide pin 13, passes by the front surface of the cassette, and, passing between the pins 14 and 15, reaches the tape take-up roll 12. The casette 10 is provided at its forward or innermost surface and bottom surface with a cut out opening 17. A shutter cover (not shown), opened by the insertion of the cassette into loaded position within the apparatus, protects the magnetic tape 16 within the cassette, when it is not being used. When the cassette 10 is mounted on the tape supply reel disc 19 and the tape take-up reel disc 18 as shown in FIG. 1, this shutter cover is held open. A tension pole 20 and a guide pole 21 are inserted within the casette opening 17. The tape supply and take-up reel discs 19 and 18 are of known arrangement. Upper reel discs 22 and 23 are respectively mounted on the upper surface thereof, with friction material interposed therebetween. In their states indicated in FIG. 1, these reel discs 18 and 19 are free to rotate.

First, the loading operation carried out by play control operation or video-audio recording control operation will be described. For play operation, a play control lever 24 is turned to the right (counterclockwise as viewed from above) to the position indicated in FIG. 2. For video-audio recording operation, a video-audio recording control button 106*c* is pushed in. At the same time, the control lever 24 is turned in the same manner, as for play operation. The control lever 24 is locked at the above described position when a solenoid 107 is activated as a result of the above manipulation.

This manipulation of the control lever 24 causes a connector 25 to rotate similarly in the counterclockwise direction as described hereinafter. A lock lever 28, rotatably held on a holder 27 fixedly mounted on a sub-chassis 26, is rotated in the clockwise direction against the force of a spring 30. Rotation is accomplished responsive to a connecting rod 29 linking one end of the lock lever 28 to the connector 25. Consequently, a supply-side tension lever 31, rotatably held on the lower side of the holder 27 is released from engagement by an engagement pin 32 embedded in the lower side of the other end of the lock lever 28. Lever 31 is thereby turned clockwise by the tension force of a spring 34 stretched between the tension lever 31 and a skew control lever 33.

As one result of this rotation of the tension lever 31, the aforementioned tension pole 20 embedded in the other end of the tension lever 31 is extracted from the interior of the cassette 10 through the opening 17. As it thus moves out, it intercepts the magnetic tape 16 and draws it out of the cassette. Furthermore, an another result of the rotating of the tension lever 31, a brake band 37 is tightened. This band encircles the reel disc 19 and is connected at its two ends, respectively, to a pin 35 embedded in the lever 31 and to an anchor member 36 on the subchassis 26. A braking force is applied for imparting a back tension to the magnetic tape 16 paid out from the tape roll 11 to the supply-side reel disc 19. The skew control lever 33 is actuated by means of a knob 38 and is locked in a specific position.

An another result of the above mentioned turning manipulation of play control lever 24, a micro switch 214 is closed as described hereinafter. An electrical circuit is closed to rotate a capstan motor 40 and a head motor 41. The rotation of the motor 40 is transmitted through a belt (not shown) to rotate in the clockwise direction an intermediate pulley 42, provided integrally with a two-stage pulley. Through a belt (not shown) motor 40 rotates in the clockwise direction a drive roller 43 and a rewind roller 44, integrally formed. Flywheel 46 is connected to a capstan 45. At this time, the drive roller 43 is pressing against the take-up reel disc 18 by the following mechanism. A counterclockwise rotating torque is imparted to the reel disc 18.

The rotation of the head motor 41 is transmitted through a pulley 47, a belt 48, and a pulley 49 to cause an upper guide drum 50*a* of the guide drum 50 to rotate clockwise at high speed. As shown in FIG. 3, the guide drum 50 comprises a lower guide drum 50*b* fixed to the chassis 51 of the apparatus. The upper guide drum 50*a* has a rotating video head (not shown). Rotatably supported at a position slightly separated from the lower guide drum 50*b*, drum 50*a* is inclined so that its part confronting an erasing head 102 is at a low position.

Figure 4A:
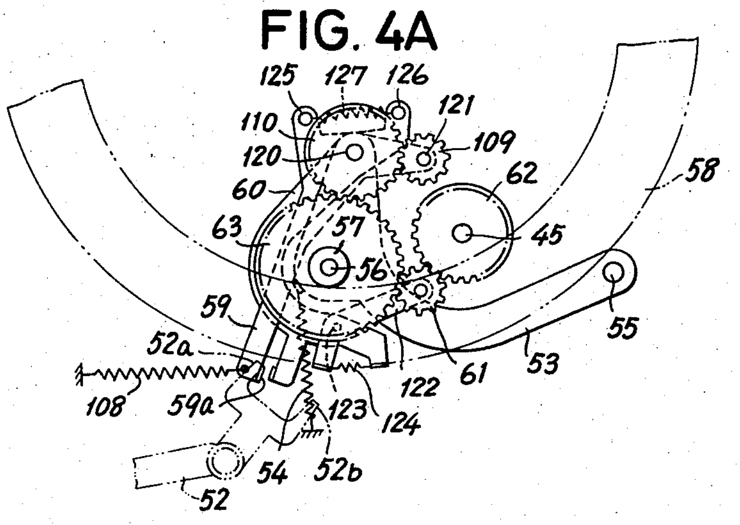
FIGS. 4A and 4B are fragmentary plan views showing one example of a mechanism for driving a revolving ring in the apparatus shown in FIG. 1 and respectively indicating the mechanism at the times of tape loading and tape unloading.

As still another result of the aforementioned turning of the play control lever 24, an operation lever 52 is turned clockwise, and the mechanism for driving the revolving ring is placed in the state indicated in FIG. 4A. A holding lever 53 is urged by the tension force of a spring 54 to rotate in the counterclockwise direction relative to a shaft 55. A drive roller 57 for loading, journaled on a stud pin 56 embedded in the holding lever 53, is pressed against the inner rim of the revolving ring 58.

As a result of the above mentioned rotation of the operation lever 52, an unloading lever 59 is placed in its disengaged state as described hereinafter. A loading lever 60 is placed in its operative state. Furthermore, for loading a gear 61 meshes with both a gear 62 formed integrally with the capstan 45 and a gear 63 formed integrally with the drive roller 57. Consequently, the clockwise rotation of the capstan 45 is transmitted by way of the gears 62, 61, and 63 to rotate the drive roller 57 clockwise. The revolving ring 58 begins to revolve clockwise from the position indicated in FIG. 1.

The revolving ring 58 is revolvably held with a specific angle of inclination relative to the chassis 51 by guide rollers 70*a*, 70*b*, and 70*c*. This revolving ring 58 is provided at specific points on its outer rim with V-shaped notches 71 and 72 and a U-shaped cutout 74. It is limited in revolution at a position where a roller 75 fits into the notch 71. A first arm 76 and a second arm 77 are rotatably connected by a shaft 78. The near part of the first arm 76 is rotatably supported on a pin 80 embedded in a bracket 79 crossing the ring 58, as seen in the side view of FIG. 3. The second arm 77 supports the aforementioned guide pole 21 embedded in the upper part of its distant end and a pin 81 embedded in the lower side thereof. The pin 81 extends to a position for fitting into the U-shaped cutout 74 and is prevented from disengaging from the cutout 74 by an arcuate guide surface 79*a* of the bracket 79.

The revolving ring 58 is provided on its upper surface with guide pins 82*a*, 82*b* and 82*c* and a pivot pin 83 embeddedly fixed thereto. A pinch roller supporting lever 84 is pivoted on the pin 83 and is urged to turn in the counterclockwise direction by a torsion spring, but is limited from thus turning at the position indicated in FIG. 1. This lever 84 is provided at its distant end with a tape guide pole 85 and at approximately its middle part with a pinch roller 86.

As the revolving ring 58 begins to revolve, an approximately L-shaped lever 87 holding the aforementioned roller 75 at the end of one of its arms is rotated clockwise against the force of a spring 88, whereupon the roller 75 is disengaged from the notch 71 and pressed against the outer peripheral surface of the ring 58. The pin 81, fitted in the U-shaped cutout 74, moves together with the revolving of the ring 58 as it is guided by the arcuate guide surface 79*a*. Consequently, the first arm 76 is rotated in the counterclockwise direction relative to the pin 80, while the second arm 77 is rotated in the clockwise direction relative to the shaft 78. As the ring 58 revolves further, the lower end portion of the pin 81 being guided by the guide surface 79*a* enters the arcuate slot 89 formed in the chassis 51 along the outer periphery of the revolving ring 58, through the opening of the slot. The pin 81 is this time guided by the side walls of the slot 89 to move together with the revolution of the ring 58, separating from the above mentioned arcuate guide surface 79*a*.

As the revolving ring 58 revolves until the cutout 74 reaches the position indicated by a two-dot chain line in FIG. 1. The pin 81 is guided by the bent slot part 89*a* of the arcuate slot 89 and is moved outward in the radial direction of the ring 58. The pin 81 thereby disengages via the open end of the cutout 74 and fits into the inner part of the bent slot part 89*a*, against the spring force of a torsion spring 90. When the ring 58 further revolves slightly from the above mentioned position, the pin 81 is completely extracted out of the cutout 74 and is pressed against the outer peripheral edge of the ring 58 by the torsion spring 90. Pin 81 is locked within the bent slot part 89*a*. During the second half portion of the revolution of the revolving ring 58, up to the above mentioned position, the first arm 76 is rotated clockwise, while the second arm 77 is rotated counterclockwise and placed in the state indicated by a two-dot chain line in FIG. 1.

The first and second arms 76 and 77 are rotated counterclockwise with respect to the shaft 80 interrelatedly with above described revolution of the revolving ring 58, as they change their folded state. The guide pole 21 fixed to the upper part of the distant end of the second arm 77, as it is extracted out through the opening 17 of the cassette 10, intercepts and engages the magnetic tape 16 uniformly over its entire width. Then, as the revolving ring 58 revolves clockwise, draws the tape out of the cassette 10 in the horizontal direction. When the pin 81 is locked within the bent slot part 89*a*, a tape loop 16*a* of approximately triangular shape is formed in the plane of the cassette 10, as indicated by two-dot chain line in FIG. 1.

Thereafter, the revolving ring 58 continues revolving by itself. Since this ring 58 is orientated with an inclination such that its lowermost position confronts the lower side position of the cassette as shown in FIG. 3, the tape guide pole 85, the pinch roller 86, the guide pins 82*a*, 82*b* and 82*c*, and like parts enter the above mentioned triangular tape loop 16*a* from below and rise as the ring 58 revolves. Consequently, the leading tape guide pole 85, as it comes out of the tape loop 16*a*, intercepts the magnetic tape 16 and pulls it around as the ring 58 revolves. This causes it to be wrapped around the cylindrical peripheral surface of the guide drum 50. At this time, the upper guide drum 50*a* is being driven at high rotational speed by the motor 41. A thin air film is formed between this upper guide drum 50*a* and the magnetic tape 16 wrapped therearound. The above mentioned pulling around of the tape 16 can be accomplished with relative ease.

When the revolving ring 58 engages the magnetic tape 16, by means of the tape guide pole 85, and revolves, it pulls the tape around and along the peripheral surface of the guide drum 50, as described above, until it reaches a point slightly short of the final revolutional position indicated in FIG. 2. A projection (not shown) provided on the lower surface of the ring 58 strikes against the aforementined bent loading lever 60, disposed in its operative position, whereupon this loading lever is rotated clockwise. Consequently, the revolving ring drive mechanism is placed in the state indicated in FIG. 4B. The gear 61 disengages from the gear 62, and the transmission of driving power from the capstan 45 to the drive roller 57 is terminated. Therefore, the capstan 45 thereafter rotates singly by itself without any special load whatsoever.

The revolving ring 58, no longer supplied with driving power, is limited in revolution at the position indicated in FIG. 2. The roller 75 is there pressing against the outer periphery of the revolving ring and has engaged with the V-shaped notch 72. As a result of the revolution of the ring 58 to its final position, a microswitch (not shown) is closed. The apparatus is thereby changed over to the recording or reproducing operational mode. In addition, a solenoid (not shown) operates to turn a pinch roller pressing lever 95 clockwise relative to a shaft 94. Furthermore, the pinch roller supporting lever 84 is engaged with the lever 95 at a pinch roller shaft 91 and thereby rotated in the clockwise direction. The pinch roller 86 is pressed against the capstan 45, clamping the magnetic tape 16 therebetween. Consequently, the tape 16 begins to travel under driving power.

Furthermore, as another result of the rotation of the pressing lever 95 to the above mentioned operative position, this rotation is transmitted through a rod (not shown) to move a stop member 96 toward the left, thereby to release a takeup-side tension lever 97. Consequently, the tension lever 97 rotates slightly counterclockwise against the force of a spring 99, in accordance with the tape tension detected by a tension pole 98 embedded in one end of the tension lever 97. At the same time, a brake shoe 100 of the other end presses against the takeup reel disc 18, whereby a tension servomechanism on the takeup side is rendered operative.

The magnetic tape 16 is guided by the guide pin 13 from the tape supply roll 11 within the cassette 10 and paid out of the cassette, when the apparatus is in the recording or reproducing mode. A constant tape tension is maintained on its supply side by the tension pole 20 operating cooperatively with the brake band 37. The tape is guided by a guide pole 101 to be drawn across a full-erasing head 102, where, for recording, erasure is carried out across the full width of the tape. The tape is then wrapped in a helical path around the peripheral surface of the guide drum 50 and over a specific angular range within limits determined by guide poles 103 and 104. Recording or reproducing of video signals is carried out on the tape by a video head (not shown). The tape is further drawn across a head block 105 disposed with an inclination, whre recording or reproducing of audio and control signals is carried out. The tape is then clamped between and driven by the capstan 45 and the pinch roller 86. The tape advancing direction is reversed by the tape guide pole 85. The tape is then guided on the opposite side of the pinch roller 86 and, to guide pins **82*a*, 82*b* and 82*c*. After passing by the guide pole 21, which is being locked, the tape is maintained at a constant tape tension on the takeup side, by the tension pole 98 as it reenters the cassette 10. Inside the tape is guided by the guide pin 14 to reach the takeup tape roll 12,** to which a torque is being imparted for urging it to rotate in the tape takeup direction.

The unloading operation carried out by stopping control of the apparatus is as follows. At the time of stop control, a stop button **106*b* is pushed. Thereupon, the solenoid 107 is deenergized. The control lever 24 is released from its locked state and is returned to its original position indicated in FIG. 1. As a result of the return of the control lever 24, the lock lever 28 and the tension lever 31 are rotated counterclockwise. The tension pole 20 returns to its original position within the cassette 10, through the opening 17. Furthermore, as a result of the above mentioned pushing of the stop button 106*b*, a solenoid (not shown) is deenergized. The pressing lever 95 is turned counterclockwise, whereupon the pinch roller 86 is separated from the capstan 45. The clamping and driving of the tape 16** is terminated.

Interrelatedly with the return movement of the control lever 24, the operation lever 52 rotates counterclockwise through a specific angle. The rotation of the loading lever 60 is limited at its disengaged position. On one hand, the unloading lever 59 is unlocked and is rotated clockwise by the force of a spring 108. Consequently, a gear 109, at the distant end of the levr 59, meshes with both the gear 62 and a gear 110. Revolving ring drive mechanism is placed in the state indicated by full line in FIG. 4B. Accordingly, clockwise rotation of the capstan 45, differing from that at the time of loading operation, is transmitted as a counterclockwise rotation to the drive roller 57 pressed against the inner rim of the revolving ring 58, with power transmitted by way of the gears 62, 109, 110 and 63. Consequently, the revolving ring 58 begins to revolve in the counterclockwise direction. The roller 75 disengages from the notch 72 and presses against the outer peripheral rim of the revolving ring.

At this time, the drive roller 43 is held in a position to press against the takeup reel disc 18, as before, by the mechanism as described hereinafter, which is held under a torque urging it to rotate in the tape take-up direction. For this reason, when the revolving ring 58 revolves in the counterclockwise direction, the magnetic tape 16 being drawn out of the cassette 10 is wound successively around the take-up tape roll 12 without slackening. When the revolving ring 58 revolves through approximately ½ revolution, the tape 16 is released from its engagement by the guide pole 85 and is formed into the tape loop **16*a* of substantially triangular shape, as indicated by a single-dot chain line in FIG. 1. It is then engaged by the locked guide pole 21.**

When the revolving ring 58 revolves further in the counterclockwise direction, the U-shaped cutout 74 reaches the position indicated by the two-dot chain line in FIG. 1 which pin 81, which is limited in movement within the bent slot part **89*a* and is pressed against the outer periphery of the ring 58 responsive to forces, such as the spring force of the torsion spring 90 and the tape tension. Pin 81 is pressed into the notch 74. Thereafter this pin 81 moves, and is guided by the arcuate slot 89 and the arcuate guide surface 79*a* of the bracket 79, together with the revolution of the ring 58. The first and second arms 76 and 77** change their bent configuration and, as a whole, are rotated in the counterclockwise direction.

When the revolving ring 58 revolves to a position slightly short of the terminal rotational position indicated in FIG. 1, a projection 111 on the lower surface of the ring 58 strikes against the unloading lever 59 in its operative position. The unloading lever 59 is rotated to the position indicated by the two-dot chain lne in FIG. 4B. Consequently, relative to the revolving ring drive mechanism, the gear 109 is released from its meshed state with the gear 62. The transmission of driving power from the capstan 45 to the revolving ring 58 is terminated.

The revolving ring 58, which is no longer driven, is limited in its revolution at the position indicated in FIG. 1 where the roller 75 pressing against the outer peripheral edge of the ring fits into the notch 71. As a result of the rotation of the ring to this position, the first and second arms 76 and 77 move from their positions shown in FIG. 2 to those indicated in FIG. 1. The guide pole 21 enters the cassette 10 through the opening 17 to return to its original position.

Furthermore, when the revolving ring 58 revolves to its original position indicated in FIG. 1, the mechanism constituting an essential part of the present invention is actuated. The pressing of the drive roller 43 against the take-up side reel disc 18 is terminated as described hereinafter. Consequently, the return of the magnetic tape 16 into the cassette 10 is terminated after all of the tape 16 has been so returned into the cassette 10. Therefore, the recording/reproducing apparatus, when various above described means are changed from their states shown in FIG. 2 to their states shown in FIG. 1, is converted from the unloading to the stop mode.

Figure 4B:
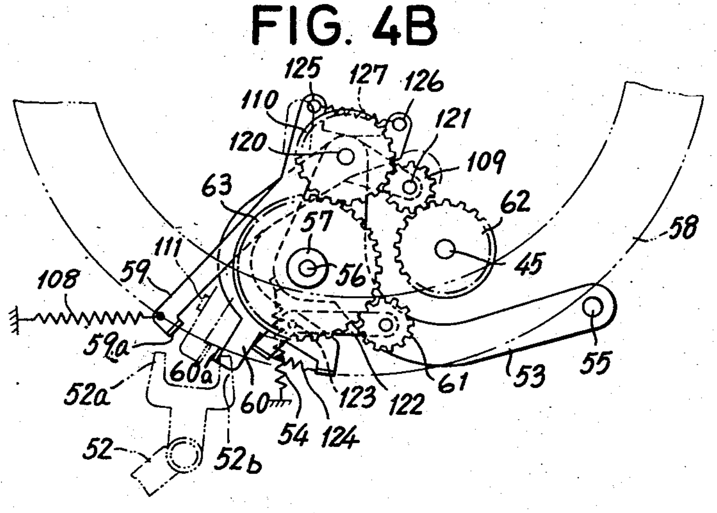

Next, to be described in the organizaton and operation of the revolving ring drive mechanism, which imparts a clockwise torque and a counterclockwise torque to the revolving ring 58, respectively for loading operation and unloading. FIGS. 4A and 4B respectively indicate the states of this drive mechanism for the two operations.

In both FIGS. 4A and 4B, the unloading lever 59 and the curved loading lever 60 are both rotatably supported independently on a pivot pin 120 embedded in the holding lever 53. Furthermore, the gear 110 is rotatably supported on the pin 120 and is meshed with the gear 63 formed unitarily with the drive roller 57. The gear 109 is rotatably held by a pivot pin embedded in the distant end of the unloaded lever 59 and is meshed with the gear 110. For this reason, when the lever 59 is rotated, the gear 109 revolves around the gear 110 as it revolves about its own axis.

A lever 122 is rotatably connected by a shaft 123 with respect to the loading lever 60 and supports at its free end a gear 61. This lever 122 is caused by a tensioned spring 124 to impart a counterclockwise torque to the loading lever 60. The gear 61 is positively meshed with the gear 63. Accordingly, when the loading lever 60 rotates, the gear 61 revolves around the gear 63 as it rotates about its own axis. Furthermore, since a spring 127 is stretched between pins 125 and 126 embeddedly fixed to the unloading lever 59 and the loading lever 60, respectively, torques urging these levers 59 and 60 to rotate toward their respective operational positions are imparted thereto.

In the loading mode of operation indicated in FIG. 4A, the unloading lever 59 as its bent part **59*a* is engaged by one arm 52*a* of the operation lever 52 rotating in the clockwise direction. Lever 59 is thereby limited in rotation at its inoperative position, and the gear 109 is separated from the gear 62. The loading lever 60, without being limited in rotation, is rotated counterclockwise by the tension force of the spring 127. The gear 61 revolves arund the gear 63 as it rotates about its own axis and is meshed by the gear 62. Consequently, the clockwise rotation of the capstan 45 is transmitted by way of the gears 62, 61, and 63 and to the drive roller 57 as a clockwise rotation, whereby the revolving ring 58** is revolved in the clockwise direction.

In the unloading mode of operation indicated in FIG. 4B, the operation lever 52 is rotating counterclockwise. The loading lever 60 at its bent part **60*a* is engaged by the other arm 52*b* of this operation lever 52 and is limited in rotation at its disengaged position to which it has rotated in the counterclockwise direction. The gear 61 is separated from the gear 62. On one hand, the unloading lever 59, without being limited in rotation, is rotated clockwise by the tension force of the springs 99 and 108. The gear 109, as it rotates about its own axis, revolves around the gear 110 and is meshed by the gear 62. Consequently, the clockwise rotation of the capstan is transmitted by way of the gears 62, 109, 110 and 63 to the drive roller 57 as a counterclockwise rotation, whereby the revolving ring 58** is driven in counterclockwise revolution.

In the above described mechanism, when it is in the recording operational mode after completion of loading operation, the unloading lever 59 and the loading lever 60 are both limited in rotation in their inoperative positions as described above. The gears 61 and 109 for transmitting the driving power for driving the revolving ring 58 are both separated from the driving gear 62. Consequently, in the recording or reproducing mode of operation, the driving gear 62 rotates independently without being subjected to any additional load whatsoever. The recording or reproducing operation is accomplished without any abnormality.

A protector plate 92, which has the shape, substantially, of the latter C and has a smooth upper surface, is provided around the guide drum 50. Plate 92 serves to catch the magnetic tape when it is drawn out of the cassette during loading and unloading operation, sags downward.

The above mentioned fast forward button **106*a* is arranged in a row at the front of the apparatus together with other control buttons 106*b*, 106*c* and 106*d*. The control button 106*d*** is for audio recording.

Furthermore, a detecting section in the form of a lamp 130 and a photocell 131 are confront each other on opposite sides of the magnetic tape 16 drawn out from the supply tape roll. The magnetic tape 16 accommodated within the cassette 10 is connected at its two ends with the inner ends of transparent leader portions (not shown) which constitute portions to be detected, each of a specific length. Further, the other ends of these leader portions are respectively fixed to the hubs (not shown) of the take-up and supply reels. The length of each leader portion is so determined that when the one end thereof is drawn out and extended to a position confronting both the lamp 130 and the photocell 131, remain several turns thereof around the supply reel hub.

Figure 5:
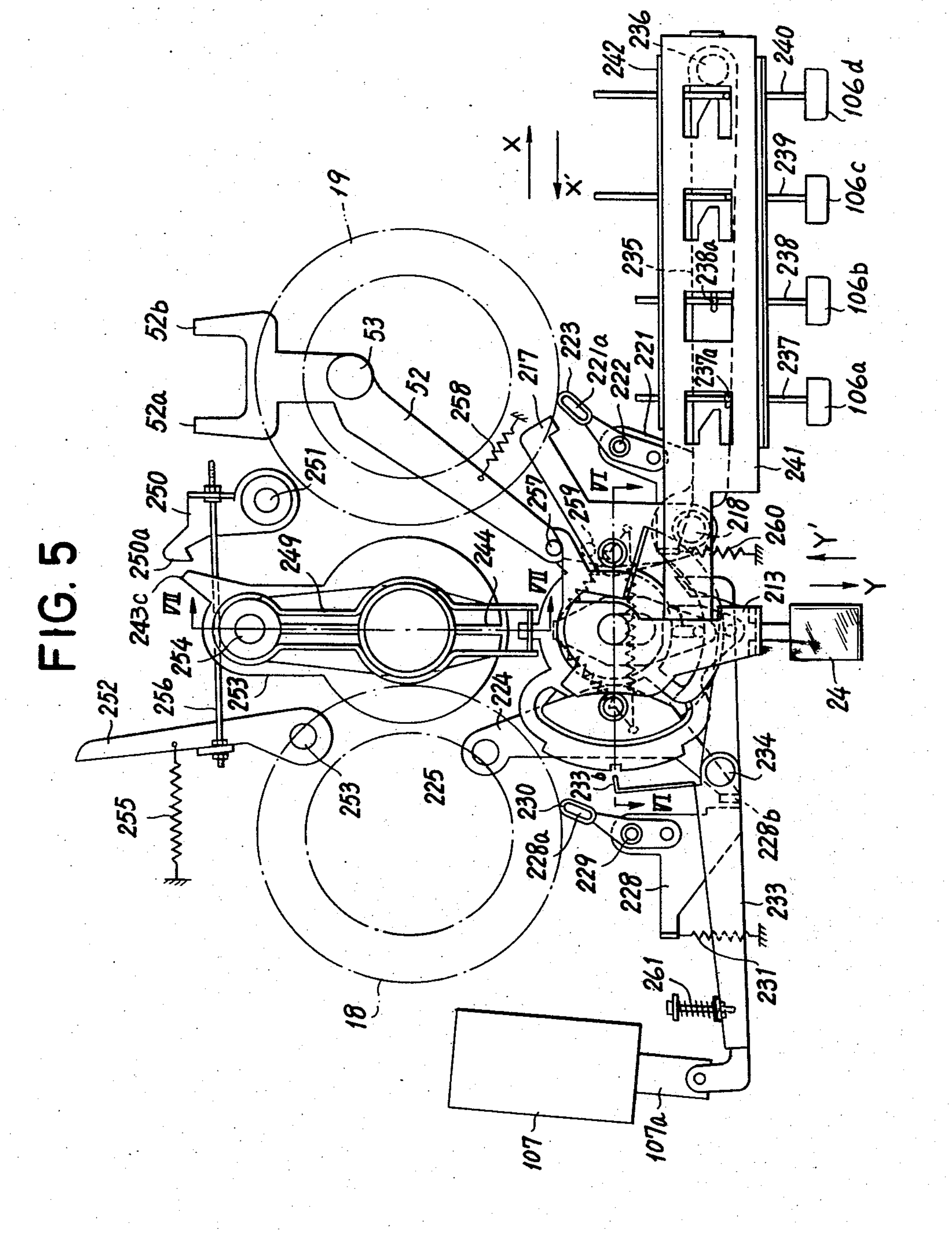
FIG. 5 is a plan view showing one embodiment of an operative device for converting to stop mode, which constitutes an essential and important part of the invention and indicating this apparatus in the disengaged state.
Figure 6:
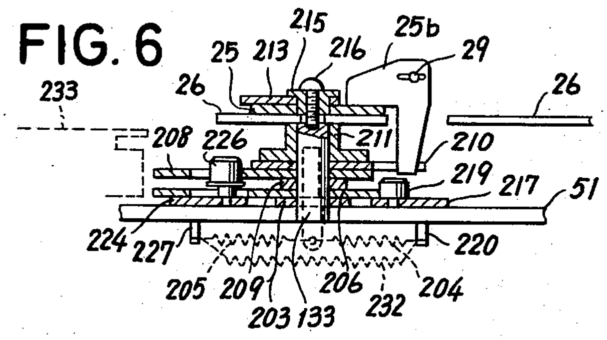
FIG. 6 is a vertical section taken along the line VI — VI in FIG. 5 as viewed in the arrow direction and showing a mechanism for control manipulation.
Figure 7:
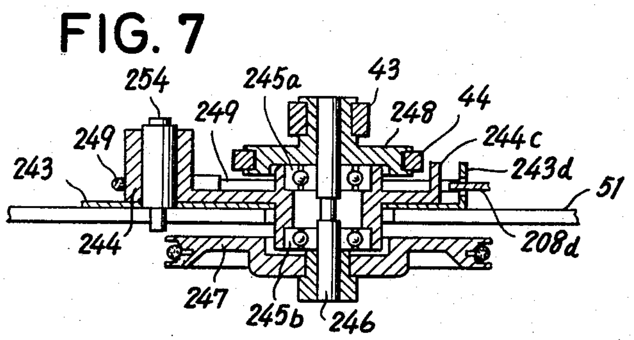
FIG. 7 is a vertical section taken along the line VII — VII in FIG. 5 as viewed in the arrow direction and showing a mechanism for reel driving.

Next, one embodiment of the operative device for converting to stop mode, constituting an essential part of the present invention, will be described in detail in conjunction with FIGS. 5 through 20, inclusive. FIG. 5 shows a plan view illustrating the organization of the operating device for indicating when the above recording/reproducing apparatus has been placed in the disengaged state shown in FIG. 1, and FIGS. 6 and 7 show vertical section taken along lines VI—VI and VII—VII, respectively.

Figures 8A, 8B, 9:
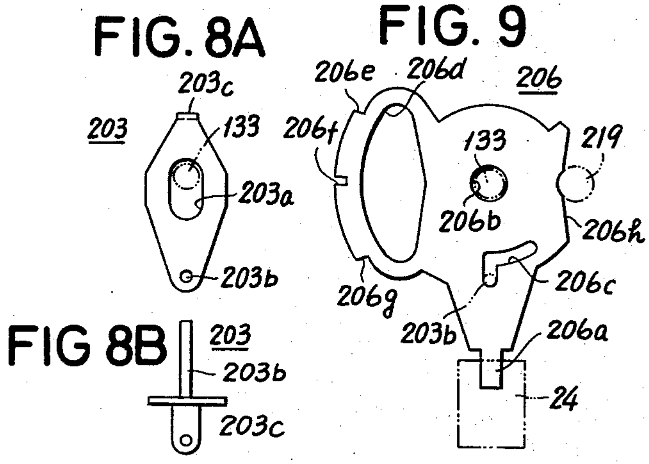
FIGS. 8A and 8B are respectively a plan view and an elevational view showing the shape of a selection cam.
FIG. 9 is a plan view showing the shape of a control cam.

First, the organization of the mechanism for control manipulation will be described. A selection cam 203, having the shape illustrated in FIGS. 8A and 8B, is engaged at a slot **203*a* with a shaft 133 embedded in the chassis 51 and held at the upper end thereof by the subchassis 26. A bent portion 203*c* is bent downward and extends through an opening (not shown) provided in the chassis 51. An engaging pin 203*b* which is engaged by the following selection lever 235 is embedded in the selection cam 203 at its upper surface. Since the springs 204 and 205 are respectively stretched between a hole provided on the bent portion 203***c* and the following pins 220 and 227, a force is imparted in the arrow Y direction as viewed in FIG. 5 to the selection cam 203, which, however, is restricted in its movement at the position shown in FIG. 8A where the shaft 133 engages the innermost part of the slot 203*a*.

A control cam 206 is placed on the selection cam 203 and, at a round hole 406*b*, is rotatably engaged with the shaft 133 as illustrated in FIG. 9. Further, the control lever 24 for manual operation is fixed to a projection 206*a* thereof. Furthermore, the cam 206 is provided with a slot 206*c* having the shape substantially of the L-shaped for passage therethrough of the engaging pin 203*b*. Cam 206 has an elliptical opening 206*d* for permitting the movement of a roller 226 which is to be moved following the turning of the cam 208 for actuating the drive roller. Still furthermore, the cam 206 is provided at its left-side peripheral surface with the notches 206*e*, 206*g* and a cutout 206*f* which is to be locked by a lock lever 233. At the right-side, cam 206 has a peripheral surface with an approximately V-shaped cam surface 206*h* for guiding a roller 219 mounted on a brake release lever 217. Moreover, when the control lever 24 is set at a central position, and the device has been disengaged, the control cam 206 is click locked as the roller 219 is engaged with an arcuate concave portion provided at the cam surface 206*h*.

Figure 10:
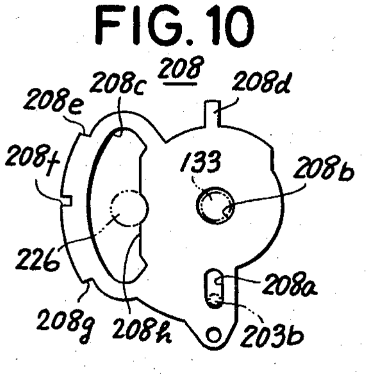
FIG. 10 is a plan view showing the shape of a cam for operating a drive roller.
Figure 11:
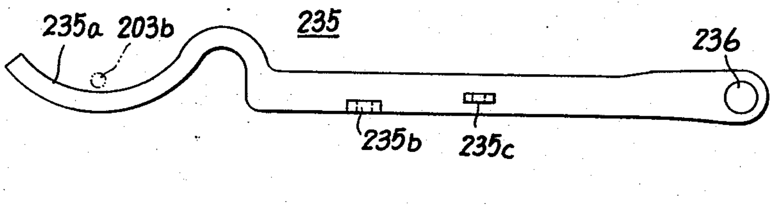
FIG. 11 is a plan view showing the shape of a selection lever.

The cam for actuating the drive roller 208 is revolvably supported around the shaft 133 by a round hole 208*b* as illustrated in FIG. 10 and provided on the cam 206. The cam 208 is provided with a slot 208*a* through which the engaging pin 203*b* is to be passed and with a cam following escape hole 208*c*. The inner surface on one side thereof forms a cam surface 208*h* for guiding a roller 226. Furthermore, the cam 208 is provided at its left-side peripheral surface with notches 208*e* and 208*g* and a cutout 208*f* to be locked by the lock lever 233 described hereinafter similarly as in the case of the aforementioned control cam 206 when the control lever 24 is manipulated according to the changeover to the diffent modes. A projection 208*d* provided at the innermost part of the cam 208 is connected to a rotating lever 243 described hereinafter.

Figures 12, 13A, 13B, 14A, 14B, 15A, 15B, 16, 17, 18A, 18B, 19, 20:
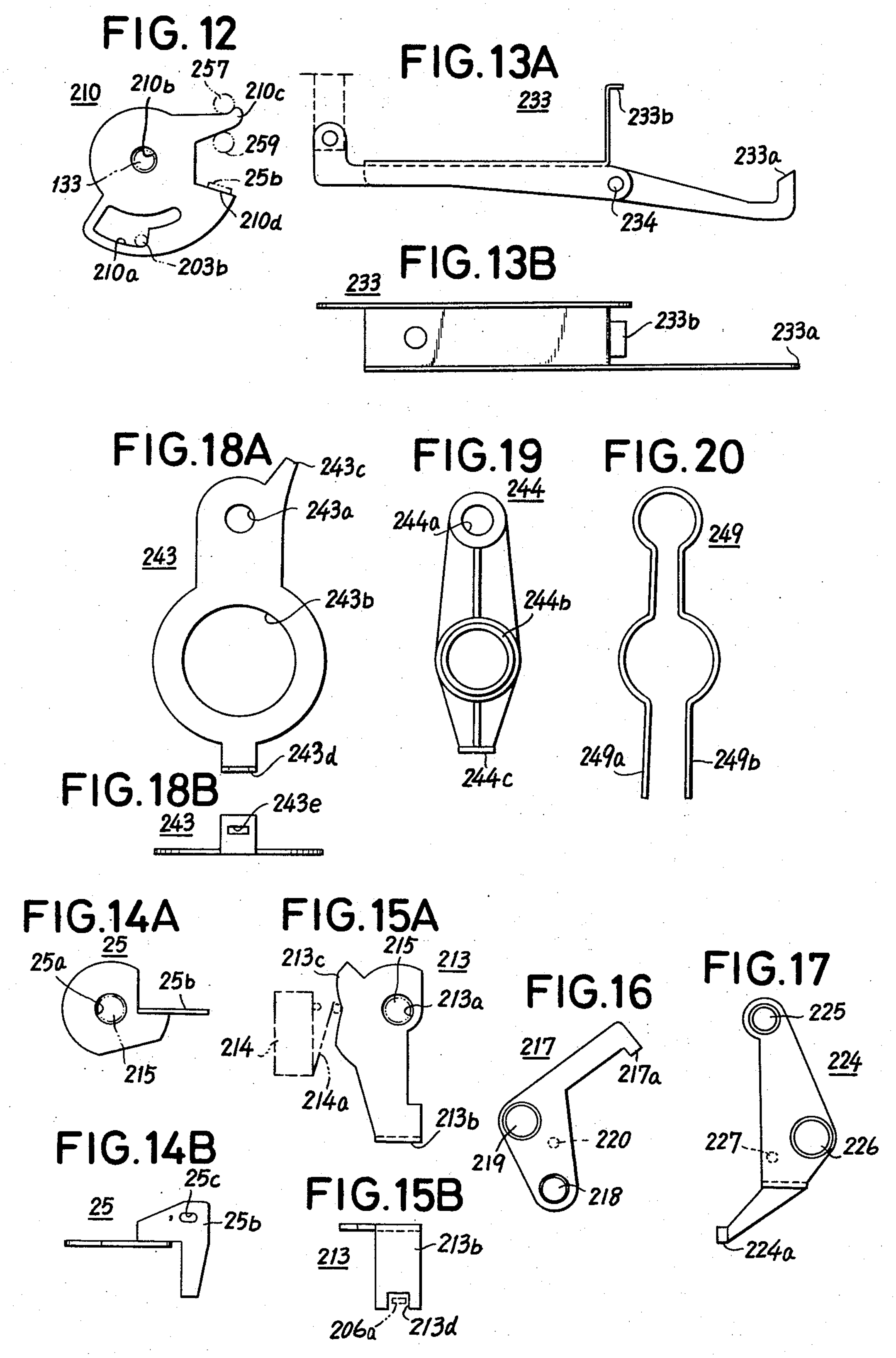
FIG. 12 is a plan view showing the shape of a cam for loading.
FIGS. 13A and 13B are respectively plan and elevational views showing the shape of a locking lever.
FIGS. 14A and 14B are respectively plan and elevational views showing the shape of a connector.
FIGS. 15A and 15B are respectively plan and elevational views showing the shape of a cam for locking.
FIGS. 16 and 17 are plan views respectively showing the shape of the brake releasing levers for supply and take-up reel discs.
FIGS. 18A and 18B are respectively plan and elevational views showing the shape of a revolving lever.
FIG. 19 is a plan view showing a holder.
FIG. 20 is a plan view showing the configuration of a spring.

A loading cam 210 is journaled on the shaft 133 by a round hole 210*b* as shown in FIG. 12, and is positioned on the aforementioned cam 208. The cam 210 is urged to rotate in the clockwise direction as described hereinafter. Cam 210 is normally restricted in its rotation at a position where a first engaging portion 210*c* is contacted and caught by a pin 259 embedded in the lower surface of the subchassis 26. Within an opening 210*a* provided in the cam 210, the engaging pin 203*b* is passing therethrough. Furthermore, the cam 210 is engaged at the first and second engaging portions 210 *c* and 210*d* with a pin 257 fixed, at one extremity thereof, to the operation lever 52 and with a bent part 25*b* of the connector 25, respectively, and is thereby urged to rotate clockwise.

Moreover, between the loading cam 210 and the subchassis 26, there is a spacer 211 with a flange portion interposed therebetween, determining the position of the aforementioned cams 203, 206, 208, and 210 with respect to the chassis 51.

On the subchassis 26, there are the connector 25 and a lock cam 213 rotatably held around a stop 215 with a flange portion at the upper side thereof, which is fixedly mounted on the shaft 133 by means of a screw 216. The connector 25 has the shape illustrated in FIGS. 14A and 14B. Connector 25 has a round hole 25*a* of a diameter to engage the stop 215 loosely and with the bent portion 25*b* at one side thereof. The bent portion 25*b* is extended at its lower portion to reach the second engaging portion 210*d* of the cam 210 and is provided at the upper extremity with a slot 25*c* for holding the end of the rod 29 as viewed in FIGS. 1 and 2.

The lock cam 213, having the shape shown in FIGS. 15A and 15B, is provided with a round hole of a diameter to receive the outer diameter portion of the stop 215, with a bent portion 213*b* extending downward at one end thereof, and with a cam surface 213*c* at one side surface thereof. The bent portion 213*b* (FIG. 15B) extends downward to the control cam 206. A U-shaped cutout 213*d* engages the projection 206*a* of the control cam 206. A microswitch 214 is disposed at a position where a movable contact thereof is contacted by a cam surface 213*c* of the cam 213 as indicated by two-dot chain line in FIG. 15A.

Next, the brake mechanism will be described. The brake release lever 217 for the supply reel disc has the shape shown in FIG. 16 and is journaled on a shaft 218. At the distant end of the lever 217, there is provided an engaging portion 217*a* confronting a projection 221*a* of a brake lever 221. At the upper surface thereof, there is rotatably held the roller 219 is contact with the cam surface 206*h* of the control cam 206. Moreover, the pin 220 embedded in the lower surface of the lever 217 extends through an opening (not shown) in the chassis 51. The springs 204 and 232 are stretched respectively between the pin 220 and the bent portion 203*c* of the selection cam 203, and between the pin 220 and the pin 227. For this reason, the brake release lever 217 is urged to rotate in the counterclockwise direction. When the control manipulating mechanism resumes a state as illustrated in FIG. 5, lever 217 is restricted in its rotation at a position wherein the roller 219 engages the arcuate recessed portion provided at the central portion of the cam surface 206*h* of the control cam 206.

The brake lever 221 for the supply reel disc is pivoted on a shaft 222 embedded in the chassis 51. A brake shoe 223 is mounted on a projection 221*a* at one end of shaft 222. Moreover, the brake lever 221 is urged to rotate counterclockwise by a spring 260 stretched between the other end thereof and a projection on the chassis 51. Accordingly, when the manipulating mechanism is in the state illustrated in FIG. 5, the brake lever 221 is rotated without any restriction caused by the brake release lever 217. The brake shoe 223 is pressed against the supply reel disc 19, thereby imparting braking force to the reel disc 19.

The brake release lever 224 for the takeup reel disc, having the shape illustrated in FIG. 17, is pivoted on the shaft 225 embedded in to the chassis 51. The lever 224 is provided at its distant end with an engaging portion 224*a* confronting an engaging portion 228*b* of the brake lever 228 (FIG. 5) and at the upper surface thereof with the freely rotatable roller 226, passing through the openings 206*d* and 208*c* in the cams 206 and 208, and confronting the cam surface 208*h* of the cam 208. Moreover, the pin 227 embedded in to the lower surface of the lever 224 passes through an opening (not shown) in the chassis 51, and extends to the lower side thereof. The springs 205 (FIG. 6) and 232 are stretched respectively between the pin 227 and the bent portion 203*a* of the aforementioned selection cam 203, and between the pin 227 and the aforementioned pin 220. For this reason, the brake release lever 224 is urged to rotate counterclockwise. If the manipulating mechanism is in the state illustrated in FIG. 5, lever 224 is limited in its rotation at a position where the roller 226 is engaged with an arcuate recessed portion provided at the central position of the cam surface 208*h* of the cam 208.

The brake lever 228 for the takeup reel disc is rotatably supported on a shaft 229 embedded in the chassis. Lever 228 supports a brake shoe at a projection 228*a* formed at one end thereof. Since a spring 231 is stretched between the chassis and the lever 228, the brake lever 228 is urged to rotate in the counterclockwise direction. Accordingly, if the control manipulation mechanism is in the disengaged state as indicated in FIG. 5, the brake lever 221 is rotated without any restriction by the brake release lever 217. The brake shoe 230 provided at the distant position thereof is pressed against the takeup reel disc 18, thereby imparting braking force to the reel disc 18. Consequently, when the manipulating mechanism is in the state shown in FIG. 5, both the supply and take-up reel discs 19 and 18 receive braking force applied by the brake shoes 223 and 230, respectively.

The lock lever 233 is folded into the U-shaped as viewed in FIGS. 13A and 13B and is rotatably held on a shaft 234 embedded in to the chassis 51. The lock lever 233 is connected, at one end, to a plunger rod 107*a* of the unloading solenoid 107 and is provided at the other end with an engaging portion 233*a* for engaging the pin 203*b* of the selection cam 203, in the automatic stopping operation. The lock lever 233 is further provided with at the middle position thereof with a bent-formed lock portion 233*b*. When the solenoid 107 is held in its disengaged state, the lock lever 233 is rotated in the counterclockwise direction by the expansion of a spring 261 interposed between the lock lever 233 itself and a projection on the chassis 51. Lever 233 is limited in its rotation at the position shown in FIG. 5 by an engaging member. The lock portion is separated from the cutout 206*f* and the notches 206*e* and 206*g* on the cam 206 from the cutout 208*f* and the notches 208*e* and 208*g* on the cam 208.

The selection lever 235, (FIG. 11) is pivoted on a shaft 236 embedded in the chassis 51 at its extremely right portion. Furthermore, the lever 235 is provided at approximately its central portion with recessed portions 235*b* and 235*c* and is provided with a curved portion 235*a* near the distant end. Moreover, normally, the selection lever 235 is in a state wherein a projection 237*a* of a lever 237 (connected to the fast-forward button 106*a*) is engaged with the recessed portion 235*b*. A projection 238*a* of a lever 238 (connected to the stop button 106*b*) is engaged with the recessed portion 235*c*. These portions are caused by the springs 204 and 205 urging, while engaging the curved portion 235*c* with the engaging pin 203*b*, in the counterclockwise direction to a position as illustrated in FIG. 5.

A bracket 242 holds the levers 237, 238, 239, and 240 connected respectively with the push buttons 106*a* through 106*d*. These levers slide back and forth in the Y-and Y'-directions (FIG. 5). Bracket 242 also holds an interlock lever 241 sliding in the X-and X'-directions, as shown by the arrows in FIG. 5. Moreover, the levers 237 through 240 respectively receive a force applied in the Y-direction in FIG. 5 by a spring (not shown). When the device is held in its disengaged state, these levers are held at the position indicated in the same drawing by any suitable arrangement. The interlock lever 241, on the other hand, is subjected to a force in the leftward direction in FIG. 5 by a spring (not shown). It is restricted in sliding at a position where the left-side edge portion thereof is engaged with the pin 203*b* embedded in the selection cam 203.

The organization of the reel driving mechanism will now be described in conjunction with FIGS. 5 and 7.

The rotating lever 243, having the shape illustrated in FIGS. 18A and 18B, is rotatably supported on a shaft 254 embedded in the chassis 51 by a round hole 243*a*. It is restricted in its rotational positon by the engagement of the projections 208*d* of the cam 208 with the cutout 243*e* provided on the bent portion 243*d*. At the central portion of the rotating lever 243, a round hole 243*d* holds a holder 244, and at the distant end thereof, there is provided a projection for engagement 233*c* to be locked by a hook lever 250.

The holder 244, having the shape illustrated in FIG. 19, is pivoted on a shaft 254 by a cylindrical portion 244*a* and holds a rotating shaft 246 in bearings 245*a* and 245*b*, in a cylindrical journal holder 244*b* at the central portion thereof. The journal holder 244*b* extends upward and downward respectively through round holes 243*b* on the rotating lever 243 and on the chassis 51, as illustrated in FIG. 7. Since the outer diameter of the journal holder 244*b* is smaller than the inner diameter of the round hole 243*b*, the holder 244 is turned over a specific angle range irrespective of the turning of the rotating lever 243. Moreover, at the other end thereof, a clamp portion 244*c* is positioned to be clamped by a spring 249.

To the lower extremity of the rotating shaft 246, there is fixed a pulley 247. A belt is stretched between the pulley 247 and the aforementioned intermediate pulley 42. Moreover, at the upper extremity of the rotating shaft 246, a two-stage pulley 248 includes the aforementioned integrally constructed drive roller 43 and rewind roller 44.

The spring 249 for shifting the reel drive roller, having the shape illustrated in FIG. 20, is attached to the holder 244 as indicated in FIGS. 5 and 7. Two arm portions 249*a* and 249*b* at the end of the spring 249 hold both the bent portion 243*d* of the rotating lever 243 and the clamp portion 244*c* of the holder 244. The holder 244 is thereby restricted at its rotational position with respect to the rotating lever 243.

A hook lever 250 is pivoted on a pin 251 and is provided with a claw portion 250*a*. Claw 250*a* engages the projection of the rotating lever 243 for locking the lever 243 at its operative position. A detection lever 252 is pivoted on a pin 253 and is urged to turn in the counterclockwise direction by a spring 255. However, it is limited from thus turning, if the automatic tape loading apparatus is being placed in the stop state shown in FIG. 1, at the position indicated in FIG. 5. In this state, the detection lever 252 is engaged by an engagement pin (not shown) embeddedly secured to the lower side of the revolving ring 58 and is thereby being rotated in the clockwise direction. At this time, the hook lever 250 is rotated clockwise by means of a connecting rod 256 and is placed in its disengaged state illustrated in FIG. 5. The claw portion 250*a* and the projection 243*c* are not locked to each other.

Moreover, the operation lever 52 is urged to turn in the counterclockwise direction by a spring 258, as described hereinbefore. However, lever 52 is limited from thus turning at the position indicated in FIG. 5, where an engagement pin 257 engages the first engagement portion 210*c* of the loading cam 210, and the arms 52*a* and 52*b* at the other end are placed in the state shown in FIG. 4B.

Next to be described is the operation of the device for converting to stop mode, which is of the above described construction. When the automatic tape loading type recording and/or reproducing apparatus is to be changed over to the reproducing or play mode, the play control lever 24 is turned counterclockwise, as described hereinbefore. This turning manipulation of the lever 24 causes the selection cam 203 and the lock cam 213 to turn unitarily with the control cam 206 in the counterclockwise direction. Furthermore, the drive roller operation cam 208 and the loading cam 210 are turned unitarily with the selection cam 203 by engaging with the engagement pin 203*b*.

As a result of the counterclockwise turning of the lock cam 213, the microswitch 214 is closed by cam surface 213*c* with the movable contact thereof as indicated in FIG. 2. Thus, the capstan motor 40 and the head motor 41 are started. Particularly, the rotation of the motor 40 is transmitted by way of the aforementioned transmission mechanism to the pulley 247. The drive roller 43 and the rewind roller 44 are rotated in the clockwise direction indicated in FIG. 1.

As a result of the turning of the counterclockwise control cam 206, the brake release lever 217 is rotated clockwise, counter to the springs 232 and 204, the roller 219 being guided by the cam surface 206*h*. Consequently, the brake lever 221 is placed in its operative position, and caused to rotate by its contact with the engagement portion 217*a* of the lever 217 against the projection 221*a* thereof, in the clockwise direction and counter to the spring 260. The brake shoe 223 is separated from the supply reel disc 19, whereupon the brake force being applied to the reel disc 19 is removed.

Similarly, as a result of the turning of the drive roller operation cam 208 in the counterclockwise direction, the brake release lever 224, is rotated clockwise counter to the springs 235 and 205, the roller 226 being guided by the cam surface 208*h*. Consequently, the brake lever 228, being placed in its operative position, is caused to rotate, by contacting of the engagement portion 224*a* of the lever 224 against the engagement portion 228*b* thereof, in the clockwise direction counter to the spring 231. The brake shoe 230 is separated from the takeup reel disc 18, whereupon the brake is removed from the reel disc 18. Thus, the brake force is removed from the supply and takeup reel discs 19 and 18.

Moreover, as a result of the turning of the loading cam 210 in the counterclockwise direction, the connector 25 is rotated counterclockwise by engagement of the bent portion 25*b* thereof with the second engagement portion 210*d*. The tension servomechanism with respect to the supply reel disc 19 is rendered operative, as described hereinbefore. At the same time, the operation lever 52 is rotated in the clockwise direction. The engagement pin 257 makes contact with the first engagement portion 210*c*. The revolving ring drive mechanism is placed in the loading operating state indicated in FIG. 4A, initiating the revolution of the ring 58 in the clockwise direction.

Furthermore, as a result of the above mentioned turning of the cam 208 in the counterclockwise direction, the rotating lever 243 is rotated over a specific angle in the clockwise direction, the cutout 243*e* thereof being engaged by the projection part 208*d*. The holder 244 is turned unitarily with the lever 243 in a state wherein the clamp portion 244*c* is being held by both ends 249*a* and 249*b* of the spring 249 (FIG. 5,20) during initial turning of the rotating lever 243. Holder 244 is limited from thus turning at the position where the drive roller 43, supported within the journal portion 244*b*, contacts the takeup reel disc 18 before the lever 243 is turned through a specific angle. Accordingly, when the rotating lever 243 is further turned to a predetermined position independently of the holder 244, a clockwise rotational force is applied to the holder 244 by the arm 249*b* of the spring 249 acting on the clamp portion 244*c*. The drive roller 43 is driven in clockwise rotation and is pressed against the reel disc 18, whereby a counterclockwise torque is imparted to the reel disc 18.

Moreover, when the rotating lever 243 turns through a specific angle, the projection 243*c* thereof is moved to a position confronting to the claw portion 250*a*. Since the revolving ring 58 starts to revolve in the clockwise direction as described hereinbefore, the detection lever 252 is released from its engagement by a pin (not shown) and is turned counterclockwise by the tension of the spring 255. Then, the connecting rod 256 turns the hook lever 250 counterclockwise to its operative position. Consequently, the rotating lever 243 is locked at its turned position by the projection 243*c* being locked with the claw portion 250*a* of the hook lever 250.

Moreover, as a result of the turning of the brake release lever 224 in the clockwise direction as mentioned hereinbefore, a microswitch (not shown) is closed and the solenoid 107 is activated. Accordingly, the lock lever 233 is turned in the clockwise direction counter to the expansion of a spring 261. The lock portion 233*b* is shifted to its operative position. For this reason, the control cam 206 and the drive roller operating cam 208 are locked at the counterclockwise portion, the notches 206*e* and 208*e* being simultaneously engaged with the lock portion 233*b*. Consequently, the selection cam 203, the loading cam 210, the connector 25, and the lock cam 213 which are turned unitarily with the control cam 206 are together restricted.

When the operating device for converting to the stop mode is operated as described hereinbefore, the apparatus is placed in the state indicated in FIG. 1, to initiate the loading operation. After the apparatus is changed to the state wherein the loading operation is accomplished as indicated in FIG. 2, the reproducing or playing operation of video and audio signals from the magnetic tape 16 is performed.

Next to be described is the conversion from the reproducing mode to the stop mode, which constitutes an essential part of the present invention. When the recording/reproducing apparatus is to be changed from the reproducing mode state shown in FIG. 2 to the stop mode state shown in FIG. 1, the push-in control manipulation of the stop button 106*d* is carried out. As a result of the pushing the stop button 106*b*, the lever 238 is moved in the Y'-direction. A microswitch (not shown) is opened to deenergize the solenoid 107. Simultaneously the selection lever 235 is turned clockwise, the recessed portion 235*c* thereof being engaged with the projection 238*c*. When the solenoid 107 releases the rod 107*a*, the lock lever 233 is turned in the counterclockwise direction by the spring 261. The locking of the control cam 206 and the drive roller operation cam 208 by means of the lock portion 233*b* is terminated.

Moreover, as a result of the turning of the selection lever 235, the selection cam 203 is shifted counter to the springs 204 and 205. The engagement pin 203*b* is engaged with the curved portion 235*a* thereof. Hence the restriction of the cams 206 and 208 by the engagement pin 203*b* is removed. Accordingly, the brake release lever 217 rotates counterclockwise by the tension of the springs 204 and 235, to their original positions where the roller 219 is fitted into the central recessed portion of the cam surface 206*h*. As a result of the rotation of the lever 217, the brake lever 221 is released and rotated in the counterclockwise direction by the spring 260. At this time, the brake shoe 223 is pressed against the supply reel disc 19, and brake force is imparted to the reel disc 19.

As another result of the above rotation of the lever 217, the control cam 206 is turned clockwise to its original position. The lock cam 213 is turned similarly, clockwise and integrally with the cam 206, whereby the microswitch 214 is again opened.

Moreover, when the solenoid 107 is deenergized and the rotating lever 243 is held at a position where the lever 243 is rotated clockwise and locked by the claw portion 250*a* of the hook lever 250, with respect to the projection 243*c* the drive roller operation cam 208 is also held at a position where the same cam is rotated counterclockwise, and projection 208*d* thereof engages the cutout 243*e*. For this reason, with respect to the take-up side reel disc 18, the brake force is released. The drive roller 43 is held pressed against it. The torque in the tape take-up direction is imparted as before.

The loading cam 210 is released from rotational restriction, is rotated clockwise to its original position, the first and second engagement portions 210*c* and 210*d* being engaged respectively by the engagement pin 257 and the bent portion 25*b*. Following the turning of the cam 210, the connector 25 is turned clockwise by the spring 30. The tension servomechanism, with respect to the supply reel disc 19, is restored to its disengaged state, illustrated in FIG. 1, as described hereinbefore. On the other hand, following the above turning of the cam 210, the operation lever 52 is turned by the tension of the spring 258 to a position as indicated in FIGS. 4B and 5. The revolving ring drive mechanism resumes the unloading state indicated in FIG. 4, whereby the counterclockwise revolution of the ring 58 is started as described hereinbefore.

As a result of the revolution of the revolving ring 58 in the counterclockwise direction, the magnetic tape 16 is drawn out of the cassette 10, and forming the specific tape path, is wound without slackening around the take-up reel. The torque is in the counterclockwise direction. Then, the tape is accommodated within the cassette 10. When the ring 58 revolves to the original position indicated in FIG. 1, the magnetic tape 16 being drawn out of the cassette 10 is completely accommodated within the cassette 10. The detection lever 252 being turned in the counterclockwise direction is struck by a pin (not shown) embedded in the lower surface of the ring 51, and is turned clockwise counter to the spring 255. As the aforementioned turning of the detection lever 252, the hook lever 250 is turned clockwise to its disengaged position by way of a connecting rod 256. The locking between the claw portion 250*a* and the projection 243*c* is terminated. For this reason, the rotating lever 243 is turned counterclockwise by the spring 249. The drive roller operation cam 208 is turned clockwise to its original position, roller 226 is shifted along the cam surface 208*h* to its central position.

As a result of the turning of the rotating lever 243 in the counterclockwise direction, the holder 244 is similarly rotated counterclockwise by engagement of the spring 249. The pressing of the drive roller 43 against the take-up reel disc 18 is released. Consequently, at this time, the torque imparted in the tape take-up direction against the reel disc 18 is stopped. The return of the magnetic tape 16 into the cassette 10 is completed.

As another result of the above turning of the cam 208, the brake release lever 224 is turned counterclockwise. Then the brake lever 228 is turned counterclockwise by the spring 231. Furthermore, the brake shoe 230 is pressed against the take-up reel disc 18, and the brake force is imparted thereto. As further result of the above turning of the cam 208 to its original position, the selection cam 208 is shifted in the arrow Y-direction by the tension of the springs 204 and 205. The above mechanism is restored to the state shown in FIG. 5.

Moreover, when the revolving ring 58 is turned to the original position indicated in FIG. 1, another microswitch (not shown) is opened and both the capstan motor 40 and the head motor 41 are deenergized, whereupon the recording/reproducing apparatus assumes the stop mode indicated in FIG. 1.

In the above embodiment, the device constituting an essential part of the present invention is adapted to the automatic-tape-loading type recording/reproducing apparatus. During the recording/reproducing mode, the magnetic tape drawn out of the cassette contacts the guide drum. However, the above device is also applicable to a recording/reproducing apparatus wherein, during the recording/reproducing mode, the magnetic tape being formed into a specific tape loop within a cassette is brought into contact with a magnetic head. In this case, an appropriate detection means detects the restoration of the tape loop, within the cassette, to the original tape loop.

According to the above operative device for converting to stop mode, the return operation of the magnetic tape 16 into the cassette 10 during unloading operation and the winding up operation of the magnetic tape within the cassette 10 during recording/reproducing mode are carried out by the same drive roller 43. Therefore, no other drive mechanism is required for the return operation of the magnetic tape 16, during the unloading mode. Moreover, the above device is constructed so that the drive roller 43 is not always held at the position where the drive roller 43 presses against the reel disc. Therefore, there is no deformation of the roller 43.

Next the operation at the time when the tape leader portion is detected while the recording/reproducing apparatus is in the recording or reproducing mode illustrated in FIG. 2, will be described. In the case where the apparatus is placed in the recording or reproducing mode, and the magnetic tape 16 is successively paid out from the supply tape roll. When the transparent leader portion (not shown) connected to the distant portion of the magnetic tape 16 is drawn out of the cassette 10, and reaches the position confronting the lamp 130 and the photocell 131, the photocell 131 receives light and gives a signal. The light radiated from the lamp 130 passes through the transparent leader portion to the cell 131. As a result, the solenoid 107, in the operative state, is automatically deenergized. The lock lever 233 is turned counterclockwise by the force of the spring 261. Consequently, the control cam 206 and the drive roller operation cam 208 are released from their located states. Both were oriented at a position to which they had turned in the counterclockwise direction. Moreover, the counterclockwise turning of the lock lever 233 causes the engagement portion **233*a* thereof to strike the engagement pin 203*b*. The selection cam 203 is forcibly shifted in the Y'-direction in FIG. 5.**

Accordingly, as in the above operation, the control cam 206, the loading cam 210, and the lock cam 213 are all turned clockwise. The brake force is imparted to the supply reel disc 19. Moreover, as a result of the above turning of the cam 210, the connector 25 is similarly turned in the clockwise direction. Then, the tension servo-mechanism for the supply reel disc 19 is disengaged. At the same time, the operation lever 52 is turned counterclockwise to place the revolving ring drive mechanism in the unloading operation state. The revolving ring 58 starts to revolve in the counterclockwise direction, and the unloading operation is accomplished. Moreover, the above turning operation of the lock cam 213 also causes the microswitch 214 to close.

In addition, the revolving lever 243, under a torque in the counterclockwise direction, is held at a position to which it has been turned clockwise responsive to an engagement of the projection **243*c* thereof and the claw portion 250*a* of the hook lever 250 rotated in the counterclockwise direction. Therefore, the holder 244 is under a torque in the clockwise direction due to the spring 249, and, is held in a state wherein the drive roller 43 is pressing the take-up reel disc 18 in the same manner as in its recording/reproducing mode. Accordingly, during the unloading operation, the torque in the tape winding direction is continuously imparted to the take-up reel disc 18. The magnetic tape 16 being drawn out of the cassette 10 is successively wound around the take-up reel in accordance with the unloading operation and is finally accommodated within the cassette 10.**

When the revolving ring 58 revolves to the original position indicated in FIG. 1, and the magnetic tape 16 is wholly accommodated within the cassette 10, the hook lever 250 is turned clockwise, in the same manner as described hereinbefore, to its disengaged position. Consequently, the rotating lever 243 is unlocked and, together with the holder 244, is rotated in the counterclockwise direction, whereby the pressing state of the drive roller 43 against the reel disc 18 is terminated.

At this time, both of the cams 208 and 203 are similarly returned to their original positions indicated in FIG. 5. The motors 40 and 41 are deenergized in response to the return operation of the revolving ring 58. The apparatus is thus changed over from the unloading mode to the stop mode. Consequently, as described above, the recording/reproducing apparatus is changed over to the unloading mode as a primary stage when the extremity portion of a specific position of the tape is detected by the detection means, and then is changed over to the stop mode as a secondary stage when the tape loading means is returned to its original position.

In the above embodiment of the present invention, the detection mechanism for detecting the extremity of the magnetic tape includes the lamp 130 and the photocell 131 on opposite sides of the tape travel path. Photocell 131 detects the transparent leader portion (not shown) connected to the tape ends. In addition to the above arrangement, it is possible to provide a detection mechanism wherein an electrically conductive metallic leaf (sensing tape) is attached to the tape at the proximity of tape ends. The sensor for detecting this metallic leaf is so disposed as to contact the tape.

Next, the manipulation and operation at the time when the recording/reproducing apparatus is to be changed over to the fast-forward mode will be described. When the apparatus, with the magnetic tape 16 wholly accommodated within the cassette 10, is to be converted to the fast-forward mode, the fast-forward button **106*a* is pushed in and is maintained at this position. Then, the control lever 24 is turned counterclockwise, as in the case of the recording/reproducing control manipulation. This push-in control of the fast-forward button 106*a* causes the selection lever 235 to turn clockwise. The recessed part 235*b* is engaged with the projection 237*a* of the lever 237. Then, the selection cam 203 is shifted in the Y'-direction in FIG. 5 by engagement of the curved portion 235*a* with the engagement pin 203*b*.**

For this reason, when the control lever 24 is turned counterclockwise together with the control cam 206, the cam 208 and 213 are both turned unitarily in the same manner as in the above manipulation. Since the engagement pin **203*b* is disengaged from the wall surface of the cutout opening 210*a*, cam 210 does not follow the counteclockwise turning of the control cam 206, but is being held at the position indicated in FIG. 5.**

Accordingly, as in the case of the above recording/reproducing control manipulation, the brake force being imparted to the supply and take-up reel discs 19 and 18 is removed. Similarly, the drive roller 43 is rotated in the clockwise direction and pressed against the take-up reel disc 18. Thereupon the same reel disc is urged to rotate in the counterclockwise direction. Moreover, both the connector 25 and the operation lever 52 are not turned. The tension servo-mechanism for the supply reel disc 19 is maintained in its disengaged state. In addition, the revolving ring drive mechanism is kept in the state indicated by the two-dot chain line in FIG. 4B, whereby the loading operation is not carried out. Consequently, the fast-forward operation is carried out with the magnetic tape 16 in its stored state within the cassette 10.

As described hereinbefore, according to the device constituting the essential portions of the present invention, the fast-forward control can be carried out by turning manipulation of the control lever 24, in the same manner as in the recording/reproducing control, after changing the engaging state of the engagement pin 203*b* with respect to the guide slots of various cams by push-in manipulation of the fast-forward button. Accordingly, the cams are caused to turn selectively different from the result of the recording/reproducing manipulation. The device is superior in the control characteristics thereof.

When the fast-forward operation is to be stopped, the stop button 106*b* is pushed in. A microswitch (not shown) is opened as described above, whereby the solenoid 107 is deenergized. Accordingly, the lock lever 233 is turned counterclockwise by the force of the spring 261. Then, both of the cams 206 and 208 are released from their locked states. At this time, the hook lever 250 is in its disengaged position. The rotating lever 243, which had been rotated by the cam 208, is unlocked. The cams 206 and 208 and the rotating lever 243 are revolved together to their original positions. As a result, the drive roller 43 is separated from the take-up reel disc 18. The brake force is imparted to both reel discs 18 and 19 to stop, the tape travel which has been continued so far.

Next, the rewind control manipulation and operation will be described in detail. When the apparatus is to be converted to the rewind mode, the control lever 24 is turned in the clockwise direction. The apparatus is in the state wherein the magnetic tape 16 is entirely returned into the cassette 10, as indicated in FIG. 1. As a result of the above turning of the control lever 24, the cams 206 and 208 are unitarily turned. The engagement pin 203*b* is engaged with the slots provided on the cams. At this time, the loading cam 210 is not turned, but is maintained at the position where the cam 210 is being restricted in its rotation in the clockwise direction by the pin 259. The pin 203*b* moves within the opening 210*a*. Accordingly, the brake force being applied to both reel discs 18 and 19 is removed. At the same time, the revolving ring drive mechanism and the tension servomechanism are both disengaged.

Moreover, the control lever 24 is locked at the position to which it has turned in the clockwise direction responsive to the actuation of the solenoid 107.

As a result of the rotation in the clockwise direction of the cam 208, the rotating lever 243 is turned counterclockwise. The large-diameter rewind roller 44 supported in the holder 244 is pressed against the supply reel disc 19 by the spring force of the spring 249. As a result the reel disc 19 applies a torque in the tape winding direction. Consequently, the tape rewinding operation is carried out at high speed with the apparatus in a state where the tape 16 is accommodated within the cassette 10.

Furthermore, when the rewinding oepration is to be terminated, push-in manipulation of the stop button 106*b* is carried out in the same manner as the above described stopping manipulation of the fast-forward operation. As a result of the push-in manipulation of the stop button 106*b*, a microswitch (not shown) is opened similarly as described above, whereupon the solenoid 107 is deenergized. Therefore, the lock lever 233 is turned counterclockwise. The cams 206 and 208 are unlocked and returned to their original positions. Then both reel discs 18 and 19 are subjected to the brake force. Particularly, following the turning of the cam 208 to its original position, the rotating lever 243 is rotated in the clockwise direction. The rewind roller 44 is separated from the supply reel disc 19, and the rewinding operation is terminated.

Further, this invention is not limited to these embodiments but various variations and modifications may be made without departing from the scope and spirit of the invention.

What I claim is:

1. An automatic-tape-loading type, recording and/or reproducing apparatus comprising:

loading means for drawing out a tape-form recording medium from a tape storing housing structure and loading the recording medium in a specific tape path outside of the housing structure;

means for accomplishing recording/reproducing of signals on/from the recording medium traveling along the specific tape path; and means for returning the recording medium on the specific tape path into the tape storing housing structure, said means for returning the recording medium comprisng a take-up reel for driving a take-up reel within the tape storing housing structure;

a driving roller for driving in rotation said reel disc, first locking means for locking the driving roller in its pressed state for driving against the take-up reel disc in relation to the control manipulation placing the apparatus in the recording/reproducing mode and for unlocking the driving roller in relation to the changeover of the operation to the stop mode, and second locking means operated at the time of drawing out of the recording medium from the tape storing housing structure to lock the driving roller in its pressed state for driving against the reel disc and unlocking the driving roller when all of the recording medium outside of the storing housing structure has been returned thereinto, said driving roller being held in pressed state against the reel disc by the second locking means still in locking state thereby to continue to drive the reel disc in rotation even though the driving roller is unlocked by the first locking means at the time of control of the operation to the stop mode.

2. An automatic-tape-loading type, recording/reproducing apparatus as claimed in claim 1 which further comprises unlocking means oeprating at the time when, as a result of movement of the loading means from a loading completion position to a returning direction in accompaniment with the operation of the means for returning the recording medium, all of the recording medium has been returned within the housing structure, and the loading means has returned to a loading starting position, to detect this result and to unlock the second locking means.

3. An automatic-tape-loading type, recording/reproducing apparatus as claimed in claim 2 in which said unlocking means comprises an engagement member provided in said loading means and means disposed in a specific position in the apparatus and operated upon being contacted and engaged by said engagement member when the tape loading means returns to its position for starting loading to unlock the second locking means which was placed in locked state at the time of recording/reproducing operation and at the time of tape returning operation.

4. An automatic-tape-loading type, recording/reproducing apparatus as claimed in claim 1 which further comprises detecting means oeprating cooperatively with a part to be detected disposed at a specific position on the recording medium, said means detecting the position thereof at the time of recording/reproducing operation of the apparatus, unlocking means for unlocking the first locking means in relation to the operation of said detecting means, and changeover means for changing over the apparatus from the recording/reproducing mode to the tape reposition mode in relation to the operation of said unlocking means.

5. An automatic-tape-loading type, recording/reproducing apparatus as claimed in claim 1 which further comprises braking means respectively for applying braking force to the supply and take-up reel discs at the time of stopping mode of the apparatus, driving means for imparting torque in the tape take-up direction to the take-up reel disc and assuming its inoperative state at the time of stopping mode of the apparatus, first converting means operation upon converting control manipulation to the recording/reproducing mode and the fast-forward mode to convert said braking means into its inoperative state and converting said driving means into its operative state, a tape supply side tension servo-mechanism placed in its inoperative state at the time of stopping mode, tape loading means driving mechanism placed in its inoperative state at the time of stopping mode, second converting means operating together with said first converting means to convert both the supply side tension servo-mechanism and the driving mechanism into their operating states, and selection means operated upon conversion control manipulation to the fast-forward mode, being disposed in a first position to couple unitarily the first and second converting means at the time of recording/reproducing control manipulation, and moving to a second position to uncouple the first and second converting means at the time of fastforward control manipulation.

6. An automatic-tape-loading type, recording/reproducing apparatus as claimed in claim 5 which further comprises a rotatable control knob for actuating the first converting means and a push button for moving the selection means to the second position.

7. An automatic-tape-loading type, recording/reproducing apparatus as claimed in claim 5 in which said first converting means comprises a first convertng member for converting the means for applying braking force to the supply reel disc into operative state and a second converting member for converting the means for applying braking force to the take-up reel disc and the driving means into operative state.

8. An automatic-tape-loading type, recording/reproducing apparatus as claimed in claim 4 in which said first converting means comprises a first converting member for converting the means for applying braking force to the supply reel disc into operative state and a second converting member for converting the means for applying braking force to the take-up reel disc and the driving means into operative state, and said changeover means comprises means for unlocking said first and second converting means which are being locked at a specific rotational position at the time of recording/reproducing mode and moving means for moving said selection means from the second position to the first position and a returning only the first converting member of the first converting means to the position for the stopping mode thereby to apply braking force to the supply reel disc.

* * * * *